(12) United States Patent
Lampkins et al.

(10) Patent No.: US 9,787,472 B1
(45) Date of Patent: Oct. 10, 2017

(54) INFORMATION SECURE PROTOCOL FOR MOBILE PROACTIVE SECRET SHARING WITH NEAR-OPTIMAL RESILIENCE

(71) Applicant: HRL Laboratories, LLC, Malibu, CA (US)

(72) Inventors: Joshua D. Lampkins, Gardena, CA (US); Karim El Defrawy, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/339,523

(22) Filed: Oct. 31, 2016

Related U.S. Application Data

(63) Continuation-in-part of application No. 14/449,115, filed on Jul. 31, 2014, now Pat. No. 9,558,359, which is a continuation-in-part of application No. 14/207,321, filed on Mar. 12, 2014, now Pat. No. 9,443,089.

(60) Provisional application No. 61/780,638, filed on Mar. 13, 2013, provisional application No. 61/861,325, filed on Aug. 1, 2013, provisional application No. 62/248,093, filed on Oct. 29, 2015.

(51) Int. Cl.
*H04L 29/06* (2006.01)
*H04L 9/08* (2006.01)

(52) U.S. Cl.
CPC .................................... *H04L 9/085* (2013.01)

(58) Field of Classification Search
CPC .............................. H04L 9/085; H04L 9/3218
USPC .......................................................... 726/26
See application file for complete search history.

(56) References Cited

U.S. PATENT DOCUMENTS

| 4,633,470 | A | 12/1986 | Welch et al. |
|---|---|---|---|
| 5,625,692 | A | 4/1997 | Herzberg et al. |
| 7,003,677 | B1 * | 2/2006 | Herzberg .............. H04L 9/0833 380/286 |
| 7,313,701 | B2 | 12/2007 | Frankel et al. |
| 2001/0038696 | A1 | 11/2001 | Frankel et al. |
| 2004/0139146 | A1 | 7/2004 | Cachin et al. |
| 2010/0037055 | A1 | 2/2010 | Fazio et al. |

(Continued)

FOREIGN PATENT DOCUMENTS

WO   WO 2015-160839   10/2015

OTHER PUBLICATIONS

Herzberg, Amir, et al. "Proactive secret sharing or: How to cope with perpetual leakage." Annual International Cryptology Conference. Springer Berlin Heidelberg, 1995.*

(Continued)

*Primary Examiner* — Syed Zaidi
(74) *Attorney, Agent, or Firm* — Tope-McKay & Associates

(57) ABSTRACT

Described is a system for mobile proactive secret sharing amongst a set of servers. A First protocol distributes a block of secret data among the set of servers, the block of secret data including shares of data. Each server holds one share of data encoding the block of secret data. A Second protocol periodically refreshes shares of data such that each server holds a new share of data that is independent of the previous share of data. A Third protocol reveals the block of secret data. Shares of data are periodically erased to preserve security against the adversary. The Second protocol provides statistical security or non-statistical security against the adversary.

18 Claims, 4 Drawing Sheets

(56) References Cited

U.S. PATENT DOCUMENTS

| | | | |
|---|---|---|---|
| 2012/0179911 | A1 | 7/2012 | Zheng et al. |
| 2012/0254619 | A1 | 10/2012 | Dhuse et al. |
| 2013/0191632 | A1 | 7/2013 | Spector et al. |
| 2014/0089683 | A1 | 3/2014 | Miller et al. |

OTHER PUBLICATIONS

Schultz, David Andrew. Mobile proactive secret sharing. Diss. Massachusetts Institute of Technology, 2007.*
Damgård, Ivan, et al. "Scalable multiparty computation with nearly optimal work and resilience." Advances in Cryptology—CRYPTO 2008. Springer Berlin Heidelberg, 2008. 241-261.*
Aho, A.V., Hoperoft, J.E., & Ullman, J.D. (1974). The Design and Analysis of Computer Algorithms. Addison-Welsey, pp. 299-300.
Beerliova-Trubiniova, Z. & Hirt, M. (2008). Perfectly-secure mpc with linear communication complexity. TCC, pp. 213-230.
Berlekamp, E.R. (1984). Algebraic Coding Theory. Aegean Park Press, Chapter 7.
Bracha. G. (1987). An O(log n) expected rounds randomized byzantine generals protocol. J. ACM, 34(4), pp. 910-920.
Cachin, C., Kursawe, K., Lysyanskaya, A., & Strobl, R. (2002). Asynchronous verifiable secret sharing and proactive cryptosystems. ACM Conference on Computer and Communications Security, pp. 88-97.
Damgard, I. & Nielsen, J.B. (2007). Scalable and unconditionally secure multiparty computation. CRYPTO, pp. 572-590.
Damgard, I., Ishai, Y., Kroigaard, M., Nielsen, J.B., & Smith, a. (2008). Scalable multiparty computation with nearly optimal work and resilience. CRYPTO, pp. 241-261.
Damgard, I., Ishai, Y., & Kroigaard, M. (2010). Perfectly secure multiparty computation and the computational overhead of cryptography. EUROCRYPT, pp. 445-465.
Desmedt, Y. & Jajodia. S. (1997). Redistributing secret shares to new access structures and its applications. Technical Report ISSE TR-97-01, George Mason University, pp. 1-14.
Fischer, M.J. & Lynch, N.A. (1982). A lower bound for the time to assure interactive consistency. Inf. Process. Lett., 14 (4), pp. 183-186.
Gao, S. (2002). A new algorithm for decoding reed-solomon codes. Communications, Information and Network Security, Kluwer, pp. 55-68.
Garay, J.A. & Moses, Y. (1993). Fully polynomial byzantine agreement in t+1 rounds. STOC, pp. 31-41.
Herzberg, A., Jarecki, S., Krawczyk. H., & Yung. M. (1995). Proactive secret sharing or: How to cope with perpetual leakage. CRYPTO, pp. 339-352.
Rabin, T. & Ben-Or, M. (1989). Verifiable secret sharing and multiparty protocols with honest majority. Proceedings of the twenty-first annual ACM symposium on Theory of computing. STOC '89, pp. 73-85.
Schultz, D. (2007). Mobile Proactive Secret Sharing. PhD thesis, Massachusetts Institute of Technology, pp. 1-157.
Wong, T.M., Wang. C., & Wing, J.M. (2002). Verifiable secret redistribution for archive system. IEEE Security in Storage Workshop, pp. 94-106.
Zhou, L., Schneider. F.B., & van Renesse, R. (2005). Apss: proactive secret sharing in asynchronous systems. ACM Trans. Inf. Syst. Secur., 8(3), pp. 259-286.
Ivan Damgard and Jesper Buus Nielsen. Scalable and unconditionally secure multiparty computation. In CRYPTO, pp. 572-590, 2007.
International Search Report of the International Searching Authority for PCT/US2016/059774; date of mailing Feb. 1, 2017.
The Written Opinion of the International Searching Authority for PCT/US2016/059774; date of mailing Feb. 1, 2017.
Notification of Transmittal of International Search Report and the Written Opinion of the International Searching Authority for PCT/US2016/059774; date of mailing Feb. 1, 2017.

Alfred V. Aho, John E. Hoperoft, and J. D. Ullman. The Design and Analysis of Computer Algorithms. Addison-Wesley, 1974. pp. 299-300.
Christian Cachin, Klaus Kursawe, Anna Lysyanskaya, and Reto Strobl. Asynchronous verifiable secret sharing and proactive cryptosystems. In ACM Conference on Computer and Communications Security, pp. 88-97,2002.
Yvo Desmedt and Sushil Jajodia. Redistributing secret shares to new access structures and its applications. Jul. 1997. Technical Report ISSE TR-97-01, George Mason University.
Amir Herzberg, Stanislaw Jarecki, Hugo Krawczyk, and Moti Yung. Proactive secret sharing or: How to cope with perpetual leakage. In CRYPTO, pp. 339-352, 1995.
Torben P. Pedersen. Non-interactive and information-theoretic secure verifiable secret sharing. In Joan Feigenbaum, editor, CRYPTO, vol. 576 of Lecture Notes in Computer Science, pp. 129-140. Springer, 1991.
David Schultz. Mobile Proactive Secret Sharing. PhD thesis, Massachusetts Institute of Technology, 2007.
Adi Shamir. How to share a secret. Commun. ACM, 22(11):612-613, 1979.
Theodore M. Wong, Chenxi Wang, and Jeannette M. Wing. Verifiable secret redistribution for archive system. In IEEE Security in Storage Workshop, pp. 94-106, 2002.
Lidong Zhou, Fred B. Schneider, and Robbert van Renesse. Apss: proactive secret sharing in asynchronous systems. ACM Trans. Inf. Syst. Secur., 8(3):259-286, 2005.
Office Action 1 for U.S. Appl. No. 14/207,321, Date mailed: May 18, 2015.
Harn, Lein, and Changlu Lin. "Strong (n, t, n) verifiable secret sharing scheme." Information Sciences 180.16 (2010): pp. 3059-3064.
Office Action 1 Response for U.S. Appl. No. 14/207,321, Date mailed Aug. 15, 2015.
Office Action 2 for U.S. Appl. No. 14/207,321, Date mailed: Dec. 14, 2015.
Office Action 2 Response for U.S. Appl. No. 14/207,321, Date mailed: Apr. 14, 2016.
Notice of Allowance for U.S. Appl. No. 14/207,321, Date mailed: May 4, 2016.
Alfred V. Aho, John E. Hoperoft, and J. D. Ullman. The Design and Analysis of Computer Algorithms. Addison-Wesley, pp. 299-300, 1974.
Elwyn R. Berlekamp. Algebraic Coding Theory. Aegean Park Press, Chapter 7, 1984.
Michael Ben-Or, Shafi Goldwasser, and Avi Wigderson. Completeness theorems for non-cryptographic fault-tolerant distributed computation (extended abstract). In STOC, pp. 1-10, 1988.
Gabriel Bracha. An O(log n) expected rounds randomized byzantine generals protocol. J. ACM, 34(4):910-920, 1987.
Zuzana Beerliova-Trubiniova and Martin Hirt. Perfectly-secure mpc with linear communication complexity. InTCC, pp. 213-230, 2008.
Christian Cachin, Klaus Kursawe, Anna Lysyanskaya, and Reto Strobl. Asynchronous verifiable secret sharing and proactive cryptosystems. In ACM Conference on Computer and Communications Security, pp. 88-97, 2002.
Ivan Damgard, Yuval Ishai, Mikkel Kroigaard, Jesper Buus Nielsen, and Adam Smith. Scalable multiparty computation with nearly optimal work and resilience. In CRYPTO, pp. 241-261, 2008.
Ivan Damgard, Yuval Ishai, and Mikkel Kroigaard. Perfectly secure multiparty computation and the computational overhead of cryptography. In EUROCRYPT, pp. 445-465, 2010.
Michael J. Fischer and Nancy A. Lynch. A lower bound for the time to assure interactive consistency. Inf. Process. Lett., 14(4):183-186, 1982.
Matthew K. Franklin and Moti Yung. Communication complexity of secure computation (extended abstract). In STOC, pp. 699-710, 1992.
Shuhong Gao. A new algorithm for decoding reed-solomon codes. In Communications, Information and Network Security, Editors V.Bhargava, H.V.Poor, V. Tarokh, and S. Yoon, pp. 55-68. Kluwer, 2002.

(56) References Cited

OTHER PUBLICATIONS

Juan A. Garay and Yoram Moses. Fully polynomial byzantine agreement in t+1 rounds. In STOC, pp. 31-41, 1993.
Oded Goldreich. Foundations of Cryptography: vol. 2, Basic Applications. Cambridge University Press, Chapter 7, 2009.
Office Action 1 for U.S. Appl. No. 14/449,115, Date mailed: Jul. 23, 2015.
Office Action 1 Response for U.S. Appl. No. 14/449,115, Date mailed: Oct. 23, 2015.
Office Action 2 for U.S. Appl. No. 14/449,115, Date mailed: Nov. 5, 2015.
Office Action 2 Response for U.S. Appl. No. 14/449,115, Date mailed: Feb. 5, 2016.
Office Action 3 for U.S. Appl. No. 14/449,115, Date mailed: Mar. 7, 2016.
Office Action 3 Response for U.S. Appl. No. 14/449,115, Date mailed: Jun. 7, 2016.
Office Action 4 for U.S. Appl. No. 14/449,115, Date mailed: Jun. 24, 2016.
Office Action 4 Response for U.S. Appl. No. 14/449,115, Date mailed: Sep. 23, 2016.
Interview Summary for U.S. Appl. No. 14/449,115, Date mailed: Sep. 26, 2016.
Notice of Allowance for U.S. Appl. No. 14/449,115, Date mailed: Oct. 6, 2016.

\* cited by examiner

Table of Symbols Used in Protocol Description

| | |
|---|---|
| $\mathcal{P}$ | The set of servers on-line and engaged in the protocol in the current stage. |
| $n$ | The number of servers engaged in the protocols in the current stage. |
| $t$ | The maximum number of servers that a malicious party can corrupt without revealing the secret. This is called the threshold of corruption. |
| $d$ | The degree of the polynomials used to share the secrets. |
| $\mathcal{P}'$, $n'$, $t'$, $d'$ | Same as above, except that these are for the new set of servers for the next stage. |
| Corr | A publicly known set of servers which are possibly corrupt. |
| $P_i$ | The server with index i in $\mathcal{P}$. |
| $\alpha_i$ | The evaluation point of server of $P_i$. This determines which share of the secret $P_i$ will get. |
| $P_j'$ | A server in $\mathcal{P}'$. |
| $\beta_j$ | The evaluation point of server $p_j'$. |

FIG. 4

INFORMATION SECURE PROTOCOL FOR MOBILE PROACTIVE SECRET SHARING WITH NEAR-OPTIMAL RESILIENCE

CROSS-REFERENCE TO RELATED APPLICATIONS

This is a Continuation-in-Part application of U.S. Non-Provisional application Ser. No. 14/449,115, filed in the United States on Jul. 31, 2014, entitled, "An Information Secure Protocol for Mobile Proactive Secret Sharing with Near-Optimal Resilience," which is a Continuation-in-Part application of U.S. Non-Provisional application Ser. No. 14/207,321, filed in the United States on Mar. 12, 2014, entitled, "System and Method for Mobile Proactive Secret Sharing," which is a Non-Provisional patent application of U.S. Provisional Application No. 61/780,638, filed in the United States on Mar. 13, 2013, entitled, "An Efficient Protocol for Mobile Proactive Secret Sharing," the entirety of which are hereby incorporated by reference. U.S. Non-Provisional application Ser. No. 14/449,115 is also a Non-Provisional patent application of U.S. Provisional Application No. 61/861,325, filed in the United States on Aug. 1, 2013, entitled, "An information Theoretically Secure Protocol for Mobile Proactive Secret Sharing with Near-Optimal Resilience," the entirety of which is hereby incorporated by reference.

This is ALSO a Non-Provisional patent application of 62/248,093, filed in the United States on Oct. 29, 2015, entitled, "An information Theoretically Secure Protocol for Mobile Proactive Secret Sharing with Near-Optimal Resilience," the entirety of which is hereby incorporated by reference.

BACKGROUND OF INVENTION (1) Field of Invention

The present invention relates to a secret sharing system and, more particularly, to a secret sharing system that provides non-statistical security.

(2) Description of Related Art

Secret sharing is a process by which secrets are distributed among an arbitrary number of servers. A concern in secret sharing is the possibility of an adversary who may corrupt a fixed portion of the servers. When the adversary corrupts a server, it learns all information stored on that server. The adversary can force corrupt servers to behave arbitrarily, irrespective of the protocol. Thus, it is imperative to implement a secure secret sharing protocol.

The secret sharing schemes of Literature Reference Nos. 5 and 14 (see the List of Incorporated Literature References) are non-mobile (i.e., they do not allow the set of servers holding the secret to change, as the present invention does). The scheme described in Literature Reference No. 9 only works for passive adversaries. In other words, it only works if corrupted servers follow the protocol.

The schemes of Literature Reference Nos. 16, 17, and 18 do not have optimal efficiency. Literature Reference Nos. 17 and 18 have communication complexity $O(exp(n))$, and Literature Reference No. 16 has communication complexity $O(n^3)$. Of the MPSS protocols listed above that are secure against active adversaries, the best communication complexity is $O(n^3)$ per secret (where n is the number of servers). The protocol described in U.S. application Ser. No. 14/449,115, which is hereby incorporated by reference as though fully set forth herein, had communication complexity $O(n^2)$ per secret.

Thus, a continuing need exists for a system having mobile proactive secret sharing (MPSS) functionality that provides non-statistical security with lower communication complexity than current systems.

SUMMARY OF INVENTION

The present invention relates to a secret sharing system and, more particularly, to a secret sharing system that provides non-statistical security. The system comprises one or more processors and a memory having instructions such that when the instructions are executed, the one or more processors perform multiple operations. A First protocol is initialized to distribute a block of secret data among a set of servers comprising n servers of a synchronous network, wherein the block of secret data comprises a plurality of shares of data, wherein each server in the set of servers holds one share of data encoding the block of secret data, and wherein the plurality of shares of data is transmitted electronically via a secure, authenticated broadcast channel. At least one Second protocol is initialized to protect against an adversary that attempts to corrupt the set of servers, wherein during a Second protocol the set of servers periodically refreshes its plurality of shares of data such that each server holds a new share of data that is independent of the previous share of data. A Third protocol reveals the block of secret data. Each server periodically erases the plurality of shares of data to preserve security against the adversary. The at least one Second protocol provides statistical security or non-statistical security against the adversary.

In another aspect, n can increase or decrease by a factor of two at each Second protocol.

In another aspect, a threshold of corruption is $\frac{1}{2}-\epsilon$ for statistical security, where $\epsilon$ is an arbitrary positive constant, and wherein provided that the adversary corrupts no more than a $\frac{1}{2}-\epsilon$ fraction of the set of servers, then the system maintains statistical security.

In another aspect, a threshold of corruption is $\frac{1}{3}-\epsilon$ for non-statistical security, where $\epsilon$ is an arbitrary positive constant, and wherein provided that the adversary corrupts no more than a $\frac{1}{3}-\epsilon$ fraction of the set of servers, then the system maintains non-statistical security.

In another aspect, if the adversary captures a fraction of data from the plurality of shares of data, then the fraction of data expires after a given time such that the expired fraction of data does not reveal any information about the blocks of secret data to the adversary.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 is a table illustrating symbols used in protocols according to some embodiments of the present disclosure.

DETAILED DESCRIPTION

Figure 1:
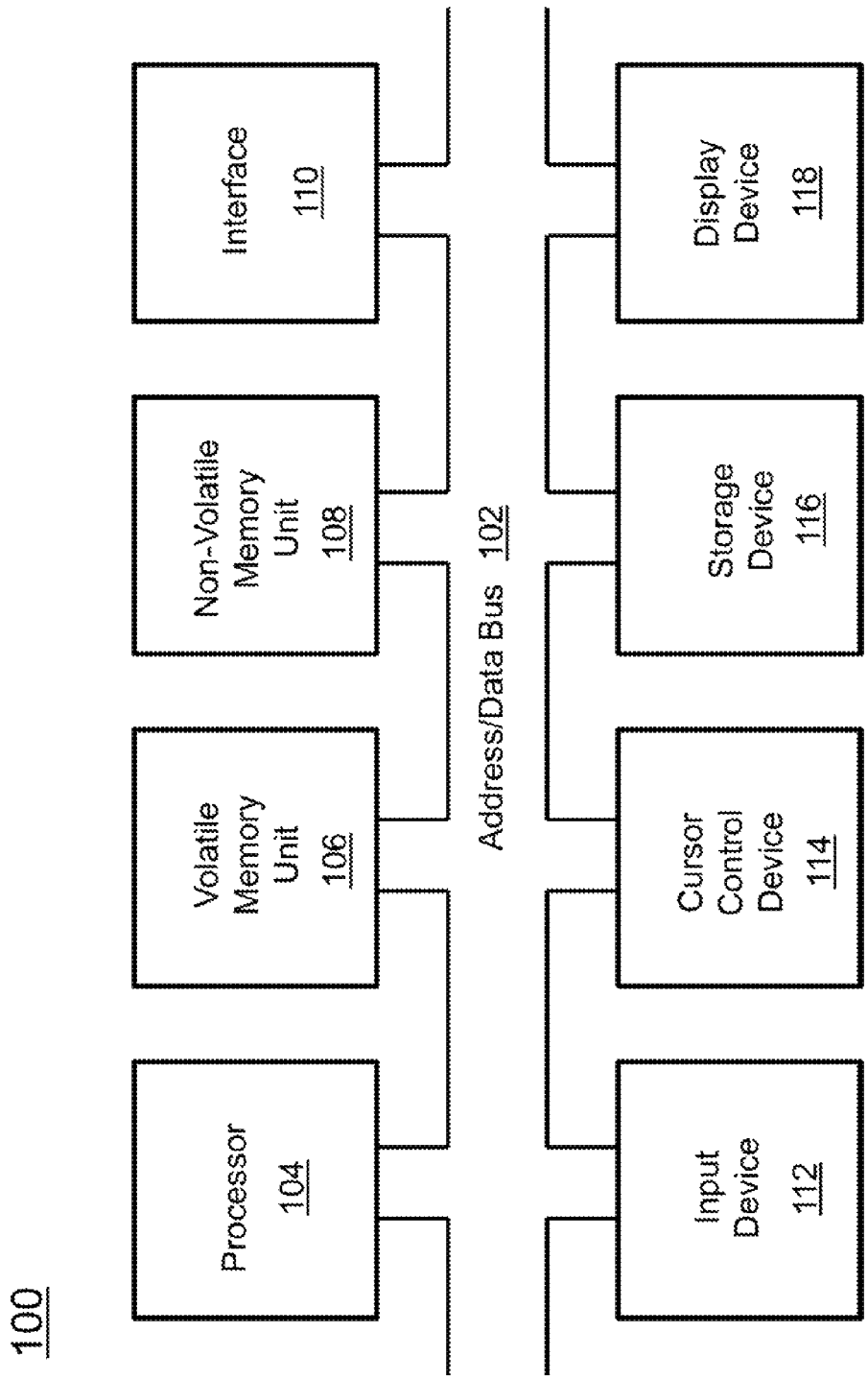
FIG. 1 is a block diagram depicting the components of a mobile proactive secret sharing system according to some embodiments of the present disclosure.

The present invention relates to a secret sharing system and, more particularly, to a secret sharing system that provides non-statistical security. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number as follows:

1. Aho, A. V., Hopcroft, J. E., & Ullman J. D. (1974). The Design and Analysis of Computer Algorithms. Addison-Welsey, 299-300.

2. Beerliova-Trubiniova, Z. & Hirt, M. (2008). Perfectly-secure mpc with linear communication complexity. *TCC*, 213-230.

3. Berlekamp, E. R. (1984). Algebraic Coding Theory. Aegean Park Press, Chapter 7.

4. Bracha. G. (1987). An O(log n) expected rounds randomized byzantine generals protocol. *J. ACM*, 34(4), 910-920.

5. Cachin, C., Kursawe, K., Lysyanskaya, A., & Strobl, R. (2002). Asynchronous verifiable secret sharing and proactive cryptosystems. ACM Conference on Computer and Communications Security, 88-97.

6. Damgard, I. & Nielsen, J. B. (2007). Scalable and unconditionally secure multiparty computation. CRYPTO, 572-590.

7. Damgard, I., Ishai, Y., Kroigaard, M., Nielsen, J. B., & Smith, A. (2008). Scalable multiparty computation with nearly optimal work and resilience. *CRYPTO*, 241-261.

8. Damgard, I., Ishai, Y., & Kroigaard, M. (2010). Perfectly secure multiparty computation and the computational overhead of cryptography. *EUROCRYPT*, 445-465.

9. Desmedt, Y. & Jajodia. S. (1997). Redistributing secret shares to new access structures and its applications. Technical Report ISSE TR-97-01, George Mason University.

10. Fischer, M. J. & Lynch, N. A. (1982). A lower bound for the time to assure interactive consistency. Inf. Process. Lett., 14(4), 183-186.

11. Gao, S. (2002). A new algorithm for decoding reed-solomon codes. Communications, Information and Network Security, Kluwer, 55-68.

12. Garay, J. A. & Moses, Y. (1993). Fully polynomial byzantine agreement in t+1 rounds. STOC, 31-41.

13. Goldreich, O. (2009). Foundations of Cryptography: Volume 2, Basic Applications. Cambridge University Press, Chapter 7.

14. Herzberg, A., Jarecki, S., Krawczyk. H., & Yung. M. (1995). Proactive secret sharing or: How to cope with perpetual leakage. CRYPTO, 339-352.

15. Rabin, T. & Ben-Or, M. (1989). Verifiable secret sharing and multiparty protocols with honest majority. Proceedings of the twenty-first annual ACM symposium on Theory of computing. *STOC '89*, 73-85.

16. Schultz, D. (2007). Mobile Proactive Secret Sharing. PhD thesis, Massachusetts Institute of Technology.

17. Wong, T. M., Wang. C., & Wing, J. M. (2002). Verifiable secret redistribution for archive system. IEEE Security in Storage Workshop, 94-106.

18. Zhou, L., Schneider. F. B., & van Renesse, R. (2005). Apss: proactive secret sharing in asynchronous systems. ACM Trans. Inf. Syst. Secur., 8(3), 259-286.

(2) Principal Aspects

Various embodiments of the invention include three "principal" aspects. The first is a mobile proactive secret sharing system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. hi an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track -pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
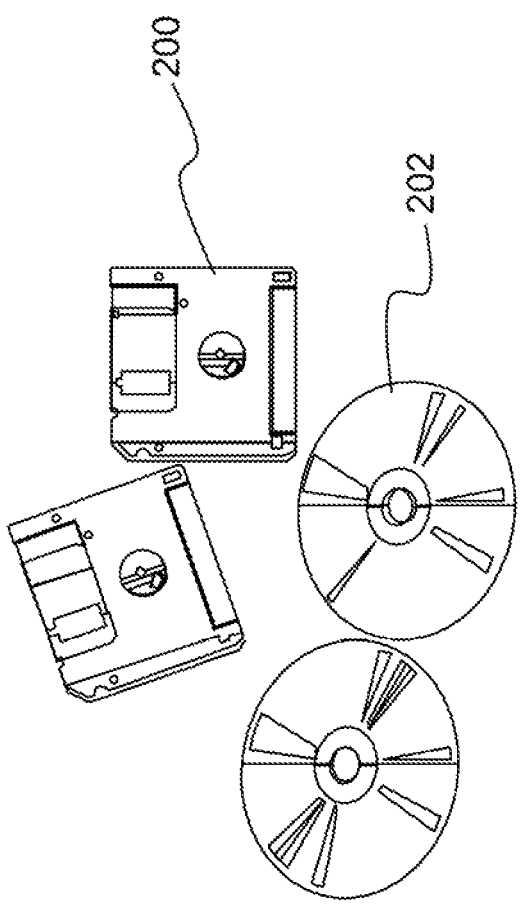
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments of the Invention (3.1) Mobile Proactive Secret Sharing (MPSS) Overview A high-level description of how MPSS would be implemented is as follows. The data to be stored is arranged in blocks of a specific size (defined later). A block of secret data is distributed among a group of servers using the Robust-Share protocol. Each server holds one share of data encoding the block of secrets. Some of the servers may be corrupted by a malicious party, called an adversary. Even though in practice there may be more than one malicious party corrupting player, one can assume without loss of generality that there is one malicious party.

Figure 3:
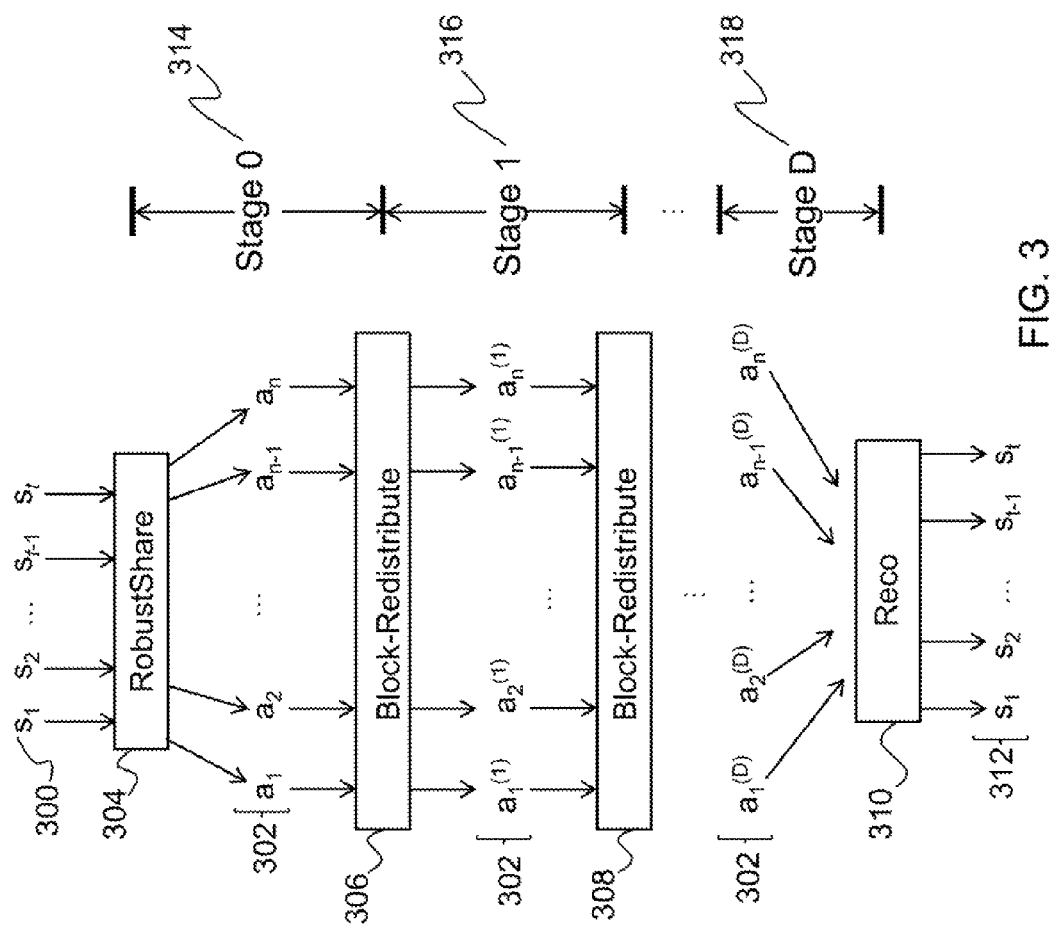
FIG. 3 is flow chart illustrating a collection of protocols according to some embodiments of the present disclosure.

To protect against the adversary, the servers periodically "refresh" their shares so that each server holds a new share of the same block of data that is independent of the previous share. The refreshing is implemented using the Block-Redistribute protocol, which is described in detail below. The set of servers engaged in the protocol and the number of servers, n, may change at each redistribution. The servers may simply store their shares of the data, or they may perform some linear operations on their shares. Once the data needs to be accessed, the servers run the Reco protocol (described below) to reveal the data. A diagram illustrating this process is shown in FIG. 3.

(3.2) Technical Preliminaries

Assuming that there are W secrets in some finite F stored among a player set P of size n, the secrets are stored as follows: fix some generator $\zeta$ of $\mathbb{F}$ *. Each batch of l>1 secrets is stored in a polynomial H of degree d (where the value of d depends on the security model as described below). The polynomial H is chosen such that $H(\zeta^j)$ is the $j^{th}$ secret for j $\in$ [l] and H ($\zeta^{l+j}$) is random for j d $\in$ [d−l+1]. The notation [X] is used to denote the set $\{1, \ldots, X\}$, an [X] x [Y] is used to denote the Cartesian product of the two sets. [A,B] denotes the set of integers [A, . . . ,B]. Each player $P_i$ $\in$ P is given $H(\alpha_i)$ as their share of the secret. In an embodiment, the RobustShare protocol described in Literature Reference No. 7 is used to perform the sharing. When the secrets are to be opened, all players send their shares to some party who interpolates the shares on the polynomials to reconstruct the secrets. The Reco protocol described in Literature Reference No. 7 is used to perform secret opening. A synchronous network model with private point-to-point channels and a private broadcast channel is assumed. These terms are defined in, for instance, chapter 7 of Literature Reference No. 13.

The unique redistribution protocol described herein redistributes the secrets to a new set of players P' of size n'. The players in P' are denoted by $P'_j$ for $\in$ [n']. The share of player $P'_j \in$ P' is $H(\beta_j)$. The system according to embodiments of the present disclosure requires that $\alpha_i \neq \beta_j$ for each i,j (and that no $\alpha_i$ or $\beta_j$ is equal to $\zeta^k$ for any $\in$ [l]). Since the labels t, l, d are used for $\mathcal{P}$, n', t', and d' are used for $\mathcal{P}$ '.

As shown in FIG. 3, the system according to the embodiments of the present disclosure incorporates a collection of protocols that implement mobile proactive secret sharing. The data to be stored is arranged in blocks of a specific size. A block of secret data (e.g., $s_1$ through $s_l$, 300) is distributed among a set of servers using a RobustShare protocol 304. Each server in the set of servers holds one share of data encoding the block of secrets. For instance, server $P_i$'s share during a stage k is $\alpha_i^{(k)}$. Some of the set of servers may be corrupted by a malicious party, called an adversary. While in practice, there may be more than one malicious party corrupting players, for the purposes of this application it is assumed that there is one malicious party.

To protect against the adversary, the servers periodically "refresh" their shares so that each server holds a new share of the same block of data that is independent of the previous share. The refreshing is implemented using a Block-Redistribute protocol. As shown in FIG. 3, the protocol may include a first invocation of a Block-Redistribute protocol 306 and a second invocation of a Block-Redistribute protocol 308 (or additional consecutive invocations of Block-Redistribute protocols). The set of servers engaged in the protocol and the number of servers, n, may change at each redistribution. The set of servers may simply store their shares of the data, or they may perform some linear operations on their shares. Once the data needs to be accessed, the set of servers runs a Reco (i.e., reconstruct) protocol 310 to reveal a set of secret data 312.

A set of servers $\mathcal{P}$ store data represented in some finite field $\mathbb{F}$. The set of servers $\mathcal{P}$ may change over the course of the entire protocol. The shares of the data will be redistributed periodically. The period between consecutive redistributions (e.g., between the first Block-Redistribute protocol 306 and the second Block-Redistribute protocol 308) is called a stage (e.g., stage 0 represented by element 314, stage 1 represented by element 316, stage D represented by element 318). Additionally, the period before the first Block-Redistribute protocol is a stage (e.g., stage 0, 314), and the period after the last redistribution is a stage (e.g., stage D, 318). Stages are defined such that the redistribution (e.g., the first Block-Redistribute protocol 306) itself is considered to be in both the stage before and after the redistribution. Referring to FIG. 3, the first Block-Redistribute protocol 306 redistribution is in both stage 0 (element 314) and stage 1 (element 316).

The redistribution protocol is written in such a way that $\mathcal{P}$ and $\mathcal{P}$ ' contain no servers in common. However, the protocol can be adapted so that the sets can overlap as follows: Each server $P_i$ in $\mathcal{P}$ is given a new identity $P'_j \in \mathcal{P}$ '. The real server plays the part of both identities during redistribution. Once the redistribution protocol is complete, the real server deletes all data associated with $P_i$, and then proceeds to act as $P'_j$.

In the system described herein, a perfectly secure (non-statistically secure) and a statistically secure version of the redistribution protocol required to construct the MPSS scheme is provided. For the perfectly secure protocol, the threshold can be made arbitrarily close to n/3 (n/2 for the statistical security). The threshold, batch size, and degree of polynomials for the two versions are described below.

In the perfectly secure (non-statistically secure) protocol, three nonzero constants ($\eta$, $\theta$, $\iota$) are fixed to satisfy $\eta+\theta+\iota<\frac{1}{3}$. The batch size, l, is the highest power of 2 not greater than $\lfloor \eta n \rfloor$, the threshold is $t=\lceil \theta n \rceil$, and the degree of polynomials that share the secrets are $d=l+t\lfloor \iota n \rfloor-1$. The number of players may increase or decrease by no more than a factor of 2 at each redistribution. Furthermore, the number of players cannot decrease so much that the corrupt players in the old group can interpolate the new polynomials (i.e., d'−l'≥t), and the number of players cannot increase so much that the uncorrupted players in the old group cannot interpolate the new polynomials in the presence of corrupt shares (i.e., d'+2t+1≤n).

In the statistically secure protocol, a low threshold is picked initially and then later raised using the player virtualization technique described in Literature Reference No. 6. The protocol in section (3.4) is written as a perfectly secure protocol with a lower threshold, and then is raised using statistically secure virtualization (see section (3.5)). For the initial, low threshold, the batch size, l, is selected to be the highest power of 2 not greater than n/4, the threshold is t<n/16, and the degree of polynomials is d=l+2t−1. In the statistically secure version, it is assumed that t will increase or decrease by a factor of no more than 2 at each redistribution (i.e. t/2≤t'≤t).

The redistribution protocol according to embodiments of the present disclosure requires the use of a hyper-invertible matrix (see Literature Reference No. 2 for a description of a hyper-invertible matrix). A hyper-invertible matrix is such that any square submatrix formed by removing rows and columns is invertible. It is shown in Literature Reference No. 2 that a hyper-invertible matrix can be constructed as follows. Pick $2\alpha$ distinct field elements $\theta_1, \ldots, \theta_\alpha$, $\phi_1, \ldots, \phi_b \in \mathbb{F}$ and let M be the matrix such that if $(y_1, \ldots, y_\alpha)^T = M(x_1, \ldots, x_b)^T$, then the points $(\theta_1, y_1), \ldots, (\theta_\alpha, y_\alpha)$ lie on the polynomial of degree ≤b−1 which evaluates to $x_j$ at $\phi_j$ for each j∈ [α]. In other words, M interpolates the points with x-coordinates $\theta_1, \ldots, \theta_\alpha$ on a polynomial given the points with x-coordinates $\phi_1, \ldots, \phi_b$ on that polynomial. Then, any submatrix of M is hyper-invertible. For the system described herein, M is a publicly known hyper-invertible matrix with n rows and n−2t columns. FIG. 4 shows a table 400 illustrating symbols as used in the protocol according to the embodiments of the present disclosure.

(3.3) Basic Protocols

Throughout the protocols, the Berlekamp-Welch algorithm is used to interpolate polynomials in the presence of corrupt shares introduced by the adversary. As was noted in Literature Reference No. 6, if M is as above and y=Mx, then one can also use Berlekamp-Welch to interpolate x from y if the adversary corrupts no more than t coordinates of y.

To perform basic tasks, such as secret sharing, generating random sharings, and opening secrets, three protocols are used from Literature Reference No. 7: the RobustShare protocol, the RanDouSha protocol, and the Reco protocol. For each of these protocols, the computational complexity is the communication complexity times a $\log^3 n$ factor. Each of these protocols is proved to be secure in Literature Reference No. 7 as follows:

RobustShare: Allows a set of dealers to verifiably share secrets in blocks.
Communication complexity of sharing W secrets is $O(W+n^3)$.
RanDouSha: Generates random sharings of blocks of secrets.
Communication complexity of generating W random secrets is $O(W+n^3)$.
Reco: Reveals a block of secrets to a server. Communication complexity of revealing W secrets is $O(W)$.

(3.4) Redistribution

Described below is the Block-Redistribute protocol for redistributing W secrets that are block-shared among a server set $\mathcal{P}$ of size n to a new set of servers $\mathcal{P}'$ of size n'. For simplicity of notation, the protocol assumes that W is a multiple of $4l^2(n-3t)$. If W is not a multiple of $4l^2(n-3t)$, one can generate random sharings of blocks to make it so. Using the RanDouSha protocol described in Literature Reference No. 7, this can be achieved with poly(n) communication complexity, and since it adds only a poly(n) amount of data to W, this does not affect the overall communication complexity of redistributing W secrets.

Since the number of secrets is a multiple of $4l^2(n-3t)$, and since the secrets are stored in blocks of size l, the number of polynomials/sharings input to the protocol is a multiple of 4l(n−3t). The polynomials are arranged in groups of size l, and then, these groups are arranged into "towers," where each tower contains n−3t groups. The total number of towers is denoted by B, so that $W=l^2(n-3t)B$. This means that the number of input polynomials is l(n−3t)B. These polynomials are indexed as $$B\{H_\alpha^{(k,m)}\} \begin{array}{l} m = 1, \ldots, B \\ k = 1, \ldots, n-3t, \\ \alpha = 1, \ldots, l \end{array}$$

where α indicates $H_\alpha^{(k,m)}$'s location in the group, k indicates $H_\alpha^{(k,m)}$'s group number within the tower, and m indicates $H_\alpha^{(k,m)}$'s tower number.

If the size of the server set is changing (i.e., n≠n' and t≠t'), then the secrets stored in polynomials of degree d will have to be re-stored in polynomials of degree d'. A change in the server set size may also cause a change in the block size, l. Recall that l is always a power of 2, meaning that l'≠l, then l' will either be twice l or half l. Therefore, there are a total of four situations that need to be considered: n increases and l stays the same; n increases and l increases; n decreases and l stays the same; and n decreases and l decreases. The protocol must be able to re-store the polynomials in any of these four cases, and the first step of the Block-Redistribute protocol according to embodiments of the present disclosure describes how to do this.

The protocol requires a slightly altered version of the RanDouSha protocol for step 4.3 below. In Literature Reference No. 7, the RanDouSha protocol calls on a sub-protocol SemiRobustShare, and in that protocol, step 2(a) is altered so that the servers check that the polynomials evaluate to zero at $\zeta^j$ for j=1, ..., l, and an accusation is broadcast if they do not. The security proof for this altered protocol is the same as in Literature Reference No. 7. When the Block-Redistribute protocol is invoked, it is assumed that the servers have some means of knowing what the new set of servers will be. There are many methods of assuring this. They may have a schedule for which servers will be added that was fixed prior to protocol execution, they may decide by communicating with one another, or there may be some trusted third party (such as a network administrator) that provides the specification. This will ultimately depend on the intended application of this protocol.

(3.4.1) Block-Redistribute $$\{H_\alpha^{(k,m)}\} \begin{array}{l} m = 1, \ldots, B \\ k = 1, \ldots, n-3t, \\ \alpha = 1, \ldots, l \end{array}$$

It is assumed that the secrets have been stored in blocks of size l (as described above) in polynomials $H_\alpha^{(k,m)}$.

(1) Changing the Threshold

If t≠t', then one of steps 1.1 through 1.4 is performed.

(1.1) Lowering the Threshold, Batch Size Stays the Same

If t'≤t and l'=l, then the following steps are performed.

(a) The servers invoke RanDouSha to generate masking polynomials $H_\alpha^{(k,m)}$ of degree≤d for k=[n−3t+,n−2t] (where α and m range over the same values as before).

(b) Define $\tilde{H}_\alpha^{(k,m)}$ for k ∈ [n] by $$(\tilde{H}_\alpha^{(1,m)}, \ldots, \tilde{H}_\alpha^{(n,m)})^T = M(H_\alpha^{(1,m)}, \ldots, H_\alpha^{(n-2t,m)})^T.$$

Each player locally computes their shares of these polynomials and sends his share of each $\tilde{H}_\alpha^{(j,m)}$ to server $P_j$.

(c) Each $P_i$ uses Berlekamp-Welch to interpolate the shares of $\tilde{H}_\alpha^{(i,m)}$ received in the previous step.

(d) Each $P_i$ computes (shares of) the unique polynomial $\tilde{h}_\alpha^{(i,m)}$ of degree≤d' that agrees with $\tilde{H}_\alpha^{(i,m)}$ on the evaluation points $\zeta^1$ through $\zeta^{d'+1}$.

(e) Each $P_i$ sends each $\tilde{h}_\alpha^{(i,m)}(\alpha_j)$ to each $P_j$.

(f) If $h_\alpha^{(k,m)}$ is defined to be the unique polynomial of degree ≤d' that agrees with $H_\alpha^{(i,m)}$ on the evaluation points $\zeta^1$ through $\zeta^{l+t'}$, then it is clear that $$(\tilde{h}_\alpha^{(1,m)}, \ldots, \tilde{h}_\alpha^{(n,m)})^T = M(h_\alpha^{(1,m)}, \ldots, h_\alpha^{(n-2t,m)})^T.$$

So each player uses Berlekamp-Welch to interpolate their shares of the $h_\alpha^{(k,m)}$ from the shares of the $\tilde{h}_\alpha^{(k,m)}$ received in the previous step.

(g) To simplify notation in the rest of the protocol, $H_\alpha^{(k,m)} \leftarrow h_\alpha^{(k,m)}$ is now set for $(\alpha, k, m) \in [l] \times [n-3t] \times [B]$.

(1.2) Lowering the Threshold, Block Size Decreases

If $t'<t$ and $l'<l$, then the following steps are performed. Since it is assumed that the number of servers decreases by no more than a factor of 2, it is known that $l'=l/2$.

(a) The players invoke RanDouSha to generate masking polynomials $H_\alpha^{(k,m)}$ of degree≤d for $k \in [n-3t+1, n-2t]$ and $\alpha \in [l]$, as well as random polynomials $R_\alpha^{(k,m)}$ of degree≤d for $k \in [n-2t]$ and $\alpha \in [2l]$ (where $m \in [B]$).

(b) Define $\tilde{H}_\alpha^{k,m}$ $k \in [n]$ by $$(\tilde{H}_\alpha^{(1,m)}, \ldots, \tilde{H}_\alpha^{(n,m)})^T = M(H_\alpha^{(1,m)}, \ldots, H_\alpha^{(n-2t,m)})^T,$$

and similarly define $\tilde{R}_\alpha^{(k,m)}$ for $k=1, \ldots, n$. Each player locally computes their shares of these polynomials and sends his share of each $\tilde{H}_\alpha^{(j,m)}$ and $\tilde{R}_\alpha^{(j,m)}$ to player $P_j$.

(c) Each $P_i$ uses Berlekamp-Welch to interpolate the shares of $\tilde{H}_\alpha^{(i,m)}$ and $\tilde{R}_\alpha^{(i,m)}$ received in the previous step.

(d) Each $P_i$ computes (shares of) the unique polynomials $\tilde{h}_{2\alpha-1}^{(i,m)}$, $\tilde{h}_{2\alpha}^{(i,m)}$ of degree≤d' for $\alpha \in [l]$ and $m \in [B]$ that satisfy the following:

$\tilde{h}_{2\alpha-1}^{(i,m)}(\zeta^j) = \tilde{H}_\alpha^{(i,m)}(\zeta^j)$ for $j \in [l']$.

$\tilde{h}_{2\alpha-1}^{(i,m)}(\zeta^{l'+j}) = \tilde{R}_{2\alpha-1}^{(i,m)}(\zeta^j)$ for $j \in [d'-l'+1]$.

$\tilde{h}_{2\alpha}^{(i,m)}(\zeta^j) = \tilde{H}_\alpha^{(i,m)}(\zeta^{l'+j})$ for $j \in [l']$.

$\tilde{h}_{2\alpha}^{(i,m)}(\zeta^{l'+j}) = \tilde{R}_{2\alpha}^{(i,m)}(\alpha_j)$ for $j \in [d'-l'+1]$.

(e) Each $P_i$ sends each $\tilde{h}_\alpha^{(i,m)}(\alpha_j)$ to each $P_j$.

(f) If $h_\alpha^{(k,m)}$ is defined to be the unique polynomials of degree ≤d' satisfying $h_{2\alpha-1}^{(k,m)}(\zeta^j) = H_\alpha^{(k,m)}(\zeta^j)$ for $j \in [l']$.

$h_{2\alpha-1}^{(k,m)}(\zeta^{l'+j}) = R_{2\alpha-1}^{(k,m)}(\zeta^j)$ for $j \in [d'-l'+1]$.

$h_{2\alpha}^{(k,m)}(\zeta^j) = H_\alpha^{(k,m)} = H_\alpha^{(k,m)}(\zeta^{l'+j})$ for $j \in [l']$.

$h_{2\alpha}^{(k,m)}(\zeta^{l'+j}) = R_{2\alpha}^{(k,m)}(\zeta^j)$ for $j \in [d'-l'+1]$.

then it is clear that $(\tilde{h}_\alpha^{(1,m)}, \ldots, \tilde{h}_\alpha^{(n,m)})^T = M(h_\alpha^{(1,m)}, \ldots, h_\alpha^{(n-2t,m)})^T.$ So each player uses Berlekamp-Welch to interpolate their shares of the $h_\alpha^{(k,m)}$ from the shares of the $\tilde{h}_\alpha^{(k,m)}$ received in the previous step.

(g) Place a lexicographical order on the polynomials $H_\alpha^{(k,m)}$ by assigning to the polynomial the vector $(m, k, \alpha)$ and using the lexicographical order on these three-dimensional vectors to induce an ordering on the polynomials. Similarly, a lexicographical order is placed on the polynomials $h_\alpha^{(k,m)}$. To simplify notation throughout the rest of the protocol, $$\{H_a^{(k,m)}\} \begin{array}{l} m=1,\ldots,4B \\ k=1,\ldots,n-3t \\ a=1,\ldots,l' \end{array} \leftarrow \{h_a^{(k,m)}\} \begin{array}{l} m=1,\ldots,B \\ k=1,\ldots,n-3t \\ a=1,\ldots,2l \end{array}$$

is relabeled in such a way that this map preserves lexicographical order. $B \leftarrow 4B$ is then relabeled.

(1.3) Raising the Threshold, Batch Size Stays the Same

If $t'>t$ and $l'=l$, then the following steps are performed.

(a) The players invoke RanDouSha to generate masking polynomials $H_\alpha^{(k,m)}$ of degree≤d for $k \in [n-3t+1, n-2t]$ (where $\alpha$ and $m$ range over the same values as before).

(b) The players invoke RanDouSha to generate random polynomials $R_\alpha^{(k,m)}$ of degree≤d' for $k \in [n-2t]$ (where $\alpha$ and $m$ range over the same values as before).

(c) Define $\tilde{H}_\alpha^{k,m}$ for $k \in [n]$ by $$(\tilde{H}_\alpha^{(1,m)}, \ldots, \tilde{H}_\alpha^{(n,m)})^T = M(H_\alpha^{(1,m)}, \ldots, H_\alpha^{(n-2t,m)})^T,$$

and similarly define $\tilde{R}_\alpha^{(k,m)}$ for $k \in [n]$. Each player locally computes their shares of these polynomials and sends his share of each $\tilde{H}_\alpha^{(j,m)}$ and $\tilde{R}_\alpha^{(j,m)}$ to player $P_j$.

(d) Each $P_i$ uses Berlekamp-Welch to interpolate $\tilde{H}_\alpha^{(i,m)}$ and $\tilde{R}_\alpha^{(i,m)}$ from the shares received in the previous step.

(e) Each $P_i$ computes (shares of) the unique polynomials $\tilde{h}_\alpha^{(i,m)}$ of degree<d' that agrees with $\tilde{H}_\alpha^{(i,m)}$ on the points $\zeta^1$ through $\zeta^l$ and agrees agrees with $\tilde{R}_\alpha^{(i,m)}$ on the points $\zeta^{l+1}$ through $\zeta^{d'+1}$.

(f) Each $P_i$ sends each $\tilde{h}_\alpha^{(i,m)}(\alpha_j)$ to each $P_j$.

(g) If $h_\alpha^{(i,m)}$ is defined to be the unique polynomial of degree ≤d' that agrees with $H_\alpha^{(i,m)}$ on the points $\zeta^1$ through $\zeta^l$ and agrees with $R_\alpha^{(i,m)}$ on the points $\zeta^{l+1}$ through $\zeta^{l+2t'}$, then it is clear that $$(\tilde{h}_\alpha^{(1,m)}, \ldots, \tilde{h}_\alpha^{(n,m)})^T = M(h_\alpha^{(1,m)}, \ldots, h_\alpha^{(n-2t,m)})^T.$$

So each player uses Berlekamp-Welch to interpolate their shares of the $h_\alpha^{(k,m)}$ from the shares of the $\tilde{h}_\alpha^{(k,m)}$ received in the previous step.

(h) To simplify notation in the rest of the protocol, $H_\alpha^{(k,m)} \leftarrow h_\alpha^{(k,m)}$ is now relabeled for $\alpha \in [l]$, $k \in [n-3t]$, and $m \in [B]$.

(1.4) Raising the Threshold, Batch Size Increases

If $t'>t$ and $l'>l$, then the following steps are performed. Since it is assumed that the number of servers increases by no more than a factor of 2, it is known that $l'=2l$.

(a) The players invoke RanDouSha to generate masking polynomials $H_\alpha^{(k,m)}$ of degree≤d for $k$ ∈ [n−3t+1,n−2t] (where α and m range over the same values as before).

(b) The servers invoke RanDouSha to generate random polynomials $R_\alpha^{k,m}$ of degree≤' for k ∈ [n−2t], α ∈ [l/2], and m ∈ [B].

(c) Define $\tilde{H}_\alpha^{(k,m)}$ for k ∈ [n] by $$(\tilde{H}_\alpha^{(1,m)}, \ldots, \tilde{H}_\alpha^{(n,m)})^T = M(H_\alpha^{(1,m)}, \ldots, H_\alpha^{(n-2t,m)})^T,$$

and similarly define $\tilde{R}_\alpha^{(k,m)}$ for k ∈ [n]. Each player locally computes their shares of these polynomials and sends his share of each $\tilde{H}_\alpha^{(j,m)}$ and $\tilde{R}_\alpha^{(j,m)}$ to player $P_j$.

(d) Each $P_i$ uses Berlekamp-Welch to interpolate the shares of $\tilde{H}_\alpha^{(i,m)}$ and $\tilde{R}_\alpha^{(i,m)}$ received in the previous step.

(e) Each $P_i$ computes (shares of) the unique polynomials $\tilde{h}_\alpha^{(i,m)}$ of degree≤d' for α ∈ l/2 and m ∈ [B] that satisfy the following:

$$\tilde{h}_\alpha^{(i,m)}(\zeta^j) = \tilde{H}_{2\alpha-1}^{(i,m)}(\zeta^j) \text{ for } j \in [l].$$

$$\tilde{h}_\alpha^{(i,m)}(\zeta^j) = \tilde{H}_{2\alpha-1}^{(i,m)}(\zeta^j) \text{ for } j \in [l].$$

$$\tilde{h}_\alpha^{(i,m)}(\zeta^{l+j}) = \tilde{H}_{2\alpha}^{(i,m)}(\zeta^j) \text{ for } j \in [l].$$

$$\tilde{h}_\alpha^{(i,m)}(\zeta^{l'+j}) = \tilde{R}_\alpha^{(i,m)}(\zeta^{l'+j}) \text{ for } j \in [d'-l'+1].$$

(f) Each $P_i$ sends each $\tilde{h}_\alpha^{(i,m)}(\alpha_j)$ to each $P_j$.

(g) If $h_\alpha^{(k,m)}$ is defined to be the unique polynomials of degree≤d' satisfying $$h_\alpha^{(k,m)}(\zeta^j) = H_{2\alpha-1}^{(k,m)}(\zeta^j) \text{ for } j \in [l],$$

$$h_\alpha^{(k,m)}(\zeta^{l+j}) = H_{2\alpha}^{(k,m)}(\zeta^j) \text{ for } j \in [l],$$

$$h_\alpha^{(k,m)}(\zeta^{l'+j}) = R_\alpha^{(k,m)}(\zeta^{l'+j}) \text{ for } j \in [d'-l'+1],$$

then it is clear that $$(\tilde{h}_\alpha^{(1,m)}, \ldots, \tilde{h}_\alpha^{(n,m)})^T = M(h_\alpha^{(1,m)}, \ldots, h_\alpha^{(n-2t,m)})^T$$

so each player uses Berlekamp-Welch to interpolate their shares of the $h_\alpha^{(k,m)}$ from the shares of the $\tilde{h}_\alpha^{(k,m)}$ received in the previous step.

(h) A lexicographical order is placed on the polynomials $h_\alpha^{(k,m)}$ by assigning to the polynomial the vector (m,k,α) and using the lexicographical order on these three-dimensional vectors to induce an ordering on the polynomials. Similarly, a lexicographical order is placed on the polynomials $h_\alpha^{(k,m)}$. To simplify notation throughout the rest of the protocol, $$\{H_a^{(k,m)}\} \begin{matrix} m = 1, \ldots, B/4 \\ k = 1, \ldots, n-3t \\ a = 1, \ldots, l' \end{matrix} \leftarrow \{h_a^{(k,m)}\} \begin{matrix} m = 1, \ldots, B \\ k = 1, \ldots, n-3t \\ a = 1, \ldots, l/2 \end{matrix}$$

is now relabeled in such a way that this map preserves lexicographical order. B←B/4 is then relabeled.

(2) Double Sharing Batched Secrets (2.1) The players generate sharings of ltB random sharings by invoking RanDouSha. These random secrets are denoted by $H_\alpha^{(k,m)}$, where α and m range over the same values as before, k ∈ [n−3t+1,n−2t].

(2.2) Each player batch-shares all of his shares of each $H_\alpha^{(k,m)}$ using RobustShare. That is, $P_i$ chooses polynomials $U^{(i,1,m)}, \ldots, U^{(i,(n-2t),m)}$ of degree≤d' such that $U^{(i,k,m)}(\zeta^j) = H_j^{(k,m)}(\alpha_i)$ for j ∈ [l] and $U^{(i,k,m)}(\zeta^{l'+j})$ is random for j ∈ [d'-l'+1] and shares them via RobustShare.

(3) Verifying Correctness (3.1) Define $\tilde{H}_\alpha^{(k,m)}$ and $\tilde{U}_\alpha^{(k,m)}$ for k ∈ [n] by $$(\tilde{H}_\alpha^{(1,m)}, \ldots, \tilde{H}_\alpha^{(n,m)})^T = M(H_\alpha^{(1,m)}, \ldots, H_\alpha^{(n-2t,m)})^T$$

and $$(\tilde{U}_\alpha^{(1,m)}, \ldots, \tilde{U}_\alpha^{(n,m)})^T = M(U_\alpha^{(1,m)}, \ldots, U_\alpha^{(n-2t,m)})^T.$$

Each player in $\mathcal{P}$ locally computes their shares of these polynomials.

(3.2) Each player in $\mathcal{P}$ sends all their shares of $\tilde{H}_\alpha^{(k,m)}$ and $\tilde{U}^{(i,k,m)}$ to player $P_k$ for each α, i, and m.

(3.3) Each $P_k$ uses Berlekamp-Welch on the shares of each $\tilde{U}^{(i,k,m)}$ to interpolate $\tilde{U}^{(i,k,m)}(\zeta^j)$ for each j ∈ [l'].

(3.4) Each $P_k$ uses Berlekamp-Welch on the shares of each $\tilde{H}_\alpha^{(k,m)}$ to interpolate $\tilde{H}^{(i,k,m)}(\alpha_i)$ for each i ∈ [n].

(3.5) Each $P_k$ checks if the shares of $\tilde{H}_\alpha^{(k,m)}$ are consistent with the interpolation of the polynomial $\tilde{U}^{(i,k,m)}$. That is, $P_k$ checks if $\tilde{U}^{(i,k,m)}(\zeta^j) = \tilde{H}_\alpha^{(k,m)}(\alpha_i)$ for each j ∈ [l']. If some $\tilde{U}^{(i,k,m)}$ does not pass this check, then $P_k$ sends ($P_k$,accuse,$P_i$) to each player in P'.

(3.6) Each $P'_j$ ∈ P' uses the accusations sent in the previous step to determine a set $\text{Corr}'_j$ of players in P that might be corrupt. More specifically, $P'_j$ reads through the list of accusations, and adds players to $\text{Corr}'_j$ according to the following rule: If neither of the players in the current accusation are in $\text{Corr}'_j$, then add both of them to $\text{Corr}'_j$; otherwise, ignore the accusation.

(4) Share Transfer (4.1) Each $P'_j$ ∈ P' selects a set of $G_j$ of players $\mathcal{P} - \text{Corr}_j$ such that $|G_j|=n-2t$. Then $P'_j$ sends this set to each member of $G_j$.

(4.2) For each $P'_j$ ∈ P', let $\{z_1^{(j)}, \ldots, z_{n-2t}^{(j)}\}$ denote the set of indices of platers in $G_j$. Let $\lambda_{j,i}$ denote the Lagrange coefficients for interpolating $P'_j$'s share of a secret from the shares of players in $G_j$ (i.e., for a polynomial f of degree≤d',$f(\beta_j)=\lambda_{j,1} f(\alpha_{z_1^{(j)}})+\ldots+\lambda_{j,n-2t}f(\alpha_{z_{n-2t}^{(j)}}))$.

(4.3) The players in $\mathcal{P}$ execute RanDouSha to generate degree d' polynomials $V^{(j,k,m)}$ for (j,k,m) ∈ [l'+1,d'+1]×[n−3t]×[B]. The players in $\mathcal{P}$ also use RanDouSha to generate degree d' polynomials $V^{(j,k,m)}$ for (j,k,m) ∈ [l']×[n−3t]×[B] that are random subject to the constraint that $V^{(j,k,m)}(\zeta^w)=0$ for w ∈ [l'].

(4.4) Define degree d' polynomials $Q_\alpha^{(k,m)}$ for (a,k,m) ∈ [l']×[n−3t]×[B] by $Q_\alpha^{(k,m)}(\lambda^w)=0$ for w ∈ [l'] and $Q_\alpha^{(k,m)}(\lambda^w)=V^{(w,k,m)}(\lambda^\alpha)$ for w ∈ [l'+1,d'+1]. Let $u_{j,i}$ denote the Lagrange coefficients for interpolating $P'_j$'s share of a secret from the points at $\zeta^i$ for i ∈ [d'+1] (i.e. for polynomial f of degree≤d',$f(\beta_j)=\mu_{j,1} f(\zeta^1)+\ldots+\mu_{j,d'+1}f(\zeta^{d'+1}))$.

(4.5) For each k ∈ [n−3t], each m ∈ [B] and each j ∈ [n'], each player in $G_j$ sends his share of $$\lambda_{j,1}U^{(z_1^{(j)},k,m)} + \ldots + \lambda_{j,n-2t}U^{(z_{n-2t}^{(j)},k,m)} + \mu_{j,1}V^{(1,k,m)} + \ldots + \mu_{j,d'+1}V^{(d'+1,k,m)}$$

to $P'_j$.

(4.6) Each $P'_j$ uses Berlekamp-Welch to interpolate the polynomials received in the previous step for each k ∈ [n−3t] and each m ∈ [B]. Since for each α ∈ [l'], $$\lambda_{j,1}U^{(z_1^{(j)},k,m)}(\zeta^\alpha) + \ldots + \lambda_{j,n-2t}U^{(z_{n-2t}^{(j)},k,m)}(\zeta^\alpha) + \mu_{j,1}V^{(1,k,m)}(\zeta^\alpha) + \ldots + \mu_{j,d'+1}V^{(d'+1,k,m)}(\zeta^\alpha) = \lambda_{j,1}H_\alpha^{(k,m)}$$

$$(\alpha_{z_j}^{(j)})+\ldots+\lambda_{j,n-2t}H_\alpha^{(k,m)}(\alpha_{z_{j+m}^{(j)}}) +$$
$$\mu_{j,1}Q_\alpha^{(k,m)}(\zeta^1)+\ldots+\mu_{j,d'+1}Q_\alpha^{(k,m)}(\zeta^{d'+1})=$$
$$H_\alpha^{(k,m)}(\beta_j)+Q_\alpha^{(k,m)}(\beta_j).$$

$P'_j$ has his share of each batch of refreshed data.

The protocol Block-Redistribute has communication complexity $O(W+n^3)$. The computational complexity is the communication complexity times a $\log^3 n$ factor.

(3.5) Player Virtualization in a Constant Number of Rounds

In the statistical case, the Block-Redistribute protocol (as written) has a low threshold of corruption. In order to increase it, server visualization is used (see Literature Reference No. 4 for a description of server visualization). The servers in the above protocol are replaced with committees of servers so that there are fewer corrupt committees than there are corrupt servers.

The result of Literature Reference No. 4 is non-constructive in that the committees are chosen randomly; it is shown that with high probability the random choices will lead to a good selection of committees. The technique of Literature Reference No. 4 was made constructive in Literature Reference No. 7.

As described in Literature Reference No. 7, it is assumed that there are n servers. For any $0<\epsilon,\delta<1$, there exists a construction of n committees of size $s=O(1/\delta\epsilon^2)$ such that if no more $$\left(\frac{1}{2}-\epsilon\right)n$$

of the servers are corrupt, then no more than $\epsilon \cdot n$ committees will be corrupt (where a committee is corrupt if s/2 or more of its members are corrupt). The members of the committees can be computed in time·polylog n.

For the protocol according to embodiments of the present disclosure, committees of size s with a corruption threshold of c, where c≤s/2, are used. Since the goal of the redistribution protocol described herein is to have statistical security, the inner protocol must have statistical security. Additionally, all of the sub-protocols must take a constant number of rounds, so the inner protocol must take a constant number of rounds (per multiplication). The Ben-Or, Goldwasser and Wigderson (BGW) protocol, described in Literature Reference No. 15, is used for the inner protocol, since it satisfies both of these properties. The value of $\epsilon$ can be determined by the end user. Since the redistribution protocol have been constructed to work with a threshold of t<n/16, there is $\epsilon=1/16$.

When virtualization is used and each server is replaced by a committee, communication between two servers is replaced by communication between two committees. Broadcasts can be emulated using point-to-point communications and a broadcast protocol. In addition, internal computations must be simulated by multi-party computation among the committee. It is clear that there are only a few types of computations that need to be performed throughout the entire protocol: addition, multiplication of two private values, multiplication of a vector of shares by a publicly known hyper-invertible matrix, and the Berlekamp-Welch algorithm. Communication between committees and each type of internal computation is described individually below.

(3.5.1) Communication Between Committees

Suppose one committee wants to send a secret value to another committee. This means that each member in the sending committee holds a Visual SourceSafe (VSS) share of a secret (as specified in Literature Reference No. 15), and they want to transfer the secret sharing such that the receiving committee holds a VSS sharing of the secret. A functionality that performs the transfer can be accomplished as follows. Suppose the parties in one committee, consisting of parties $A_1, \ldots, A_s$, must send information with tags to another committee consisting of parties $B_1, \ldots, B_s$. All of these parties compute a functionality which transfers the data. There is one input gate for each $A_j$ and one output gate for each $B_i$. The input from $A_j$ is her share and authentication/verification tags for the piece of data that the committee $\{A_1, \ldots, A_s\}$ holds. The output for $B_j$ is her newly generated share and authentication/verification tags for this same piece of data, now held by the committee $\{B_1, \ldots, B_s\}$. This is done such that the new sharing is independent of the initial sharing. Because the committee sizes are constant, this does not asymptotically increase the communication or computational complexity. Additions are performed simply by adding shares as specified in the BGW protocol.

The only situation in which a committee needs to multiply two private values is when the committee needs to multiply two of its shares; this only occurs in the Multiply protocol. These multiplications will be handled as specified in Literature Reference No. 15. Since the committee size is constant, this only requires a constant amount of computation per multiplication.

In order to reduce the number of broadcasts used in the main protocol, all the broadcasts in the multiplication sub-protocol will be implemented with point-to-point channels using a broadcast protocol. The minimum number of rounds to implement a (deterministic) broadcast protocol for a committee with at most c corrupt servers is c30 1 (see Literature Reference No. 10). Since c is a constant that depends on $\epsilon$, the protocol according to embodiments of the present disclosure will work in a constant number of rounds. Any broadcast protocol that achieves the c+1 lower bound on the number of rounds and has communication and computational complexity polynomial in the number of committee members will work, For instance, the protocol described in Literature Reference No. 12 may be used.

Multiplication by hyper-invertible matrices can be done efficiently in committees. Each committee member simply performs the required operations on their shares. Each hyper-invertible matrix in the redistribution protocol has dimension $\Theta(n)$ by $\Theta(n)$. Normally, such a computation would require $\Theta(n^2)$ multiplications. However, since the hyper-invertible matrices model polynomial interpolation and evaluation, one can use efficient algorithms from the computer science literature. For instance, Literature Reference No. 1 can be used to do these computations with only $O(n \log^3 n)$ multiplications.

The application of the Berlekamp-Welch algorithm in committees requires some care, because a straightforward application of the BGW protocol would lead to non-constant round complexity. The Berlekamp-Welch algorithm can be performed with $O(n \log^3(n))$ computational complexity (see Literature Reference No. 11). This adds a $\log^3(n)$ factor to the computational complexity, which is not problematic. However, it requires $O(\text{polylog}(n))$ rounds of communication, and the redistribution protocol must work in a constant number of rounds.

An alteration of the Berlekamp-Welch algorithm was constructed for committees that have constant round complexity. This requires generating extra masking randomness. In fact, for each polynomial to interpolate, additional c polynomials must be generated. However, the committee size is fixed throughout the protocol (as it only depends on ϵ). Therefore, generating these extra sharings does not affect the asymptotic complexity of the protocol.

When the redistribution protocol is virtualized, each execution of the Berlekamp-Welch algorithm is replaced with an execution of the protocol Committee-BW described below. The protocol uses RanDouSha as a sub-protocol to generate random masking polynomials. The number of polynomials generated and the degrees of the polynomials will be different in different steps. For every polynomial the servers want to interpolate, they generate c masking polynomials of the same degree. Again, this does not add to the overall communication complexity of the protocol since c is constant once ϵ is decided. Note that in some instances, a server/committee is not interpolating a polynomial, but rather a vector generated by a hyper-invertible matrix. However, since the hyper-invertible matrices used model polynomial interpolation, such a vector can be seen as a set of evaluation points on a polynomial.

The protocol Committee-BW implements a committee performing Berlekamp-Welch in a constant number of rounds. $\mathcal{P} = \{P_i\}_{i=1}^n$ is used to denote the set of committees and $Com = \{p_j\}_{j=1}^s$ to denote the committee that is to perform Berlekamp-Welch. The evaluation point of $P_i$ is $\alpha_i$ and the evaluation point of $p_j$ is $y_j$. It is assumed that the polynomial f to be interpolated has already been sent to the committee. This means that each share $f(\alpha_i)$ is Shamir-shared among the committee as a polynomial $f_{\alpha_i}$ of degree no more than c such that $f_{\alpha_i}(0) = f(\alpha_i)$. Furthermore, the committee holds an additional c polynomials, $r^{(1)}, \ldots, r^{(c)}$, shared with polynomials $r_{\alpha_i}^{(k)}$ of degree no more than c such that $r_{\alpha_i}^{(k)}(0) = r^{(k)}(\alpha_i)$. The protocol uses an s by c+1 hyper-invertible matrix M', which is publicly known and fixed throughout all protocols.

(3.5.2) Committee-BW (c, Com, $\{f_{\alpha_i}\}_{i=1}^n$)
1. The committees invoke RanDouSha to generate random polynomials $r^{(k)}$ for k=1, . . . ,c.
2. Each committee sends its shares of each $r^{(k)}$ to Com. Define $r_{\alpha_i}^{(k)}$ described above.
3. Define polynomials $u^{(1)}, \ldots, u^{(s)}$ by $(u^{(1)}, \ldots, u^{(s)})^T = M'(f, r^{(1)}, \ldots, r^{(c)})^T$. Similarly, define $(u_{\alpha_i}^{(1)}, \ldots, u_{\alpha_i}^{(s)})^T = M'(f_{\alpha_i}, r_{\alpha_i}^{(1)}, \ldots, r_{\alpha_i}^{(c)})^T$ for each $P_i$. Each $p_j$ locally computes his VSS share of each $u_{\alpha_i}^{(k)}$.
4. Each $p_j$ sends his share of $u_{\alpha_i}$ to $p_k$ for each $P_i$.
5. Each $p_j$ interpolates $u_{\alpha_i}^{(k)}$ (and hence $u^{(k)}(\alpha_i)$) from the shares received in the previous step as described in Literature Reference No. 15.
6. Each $p_j$ uses Berlekamp-Welch to interpolate $u^{(k)}$, noting which shares he believes to be incorrect.
7. Each $p_j$ sends to each member of Com the index of each committee $P_i$ which he believes to have sent an incorrect share (these are called "negative votes").
8. For each $\alpha_i$ that received more than a negative votes in the previous step, the committee Com concludes that committee $P_i$ is corrupt, and his share of f is unneeded (even if the value of $f(\alpha_i)$ sent by $P_i$ was correct). Let I be the set of all i such that $P_i$ was not deemed to be corrupt.
9. Suppose the committee wants to interpolate a set of points $\xi_1, \ldots \xi_m$. Let $\{\lambda_i^{(k)}\}_{i \in I}$ denote the Lagrange coefficients for interpolating the point $\xi_k$ on a polynomial using the points $\{\alpha_i\}_{i \in I}$. Each $p_j$ locally computes his share of $f(\xi_k)$ for each k=1, . . . ,m by computing her share of $$f_{\xi_k} = \sum_{i \in I} \lambda_i^{(k)} f_{\alpha_i}$$

as specified in Literature Reference No. 15.

Invoking Committee-BW W/n times in parallel has communication complexity O(W+poly(n)) (assuming the committee wants to interpolate O(n) points per invocation, which will always be the case in the execution of the protocol). It takes a constant number of communication rounds.

In summary, the system according to embodiments of the present disclosure is not obvious in light of existing literature on MPSS because it uses double sharing for block-shared secrets. Double sharing has never been applied to block-shared secrets in existing literature. In the statistical security setting, it uses server visualization as in Literature Reference No. 7, but straightforward implantation of virtualization cannot be used. Instead, the application of the Berlekamp-Welch algorithm (see Literature Reference No. 3) is replaced with a protocol for a virtualized server to perform this task in a constant number of communication rounds.

Furthermore, the invention described herein differs from previously known mobile proactive secret sharing protocols in that among those protocols secure against active adversaries, this protocol has the lowest communication complexity. The most efficient existing protocol for MPSS secure against active adversaries had communication complexity $O(n^3)$ per secret (where n is the number of servers engaged in the protocol). The present system has communication complexity $O(W+n^3)$ for redistributing W secrets, which means that if W is at least $n^3$, the per-secret communication complexity for redistribution is O(1).

Additionally, the invention described herein includes protocols implementing the MPSS functionality. These protocols allow secret data to be securely distributed among a group of servers (servers are also called players or parties in Multiparty Computation (MPC) literature) in such a way that if an adversary compromises no more than a fixed fraction of the servers, the adversary will not gain any information about the data and cannot cause data corruption. This remains true even if the adversary is allowed to eventually compromise all of the servers, so long as no more than a fixed fraction is compromised during any given stage of the operation of the MPSS protocol.

The system according to embodiments of the present disclosures achieves the same functionality as U.S. application Ser. No. 14/207,321 (which is hereby incorporated by reference as though fully set forth herein). The protocols described herein can provide either statistical or non-statistical security, whereas the protocol disclosed in U.S. application Ser. No. 14/449,115 only provided cryptographic security. Cryptographic security means that the probability of an adversary being able to compromise the security of the computation is negligibly low and that the protocol is only secure under the assumption that a certain mathematical problem is infeasible for the adversary to solve.

In contrast, statistical security means the probability of an adversary being able to compromise the security of the computation is negligibly low, and this security does not rely on any mathematical infeasibility assumption. Non-statistical security means the probability of an adversary being able to compromise the security of the computation is zero and this security does not rely on any mathematical infeasibility assumption.

The protocol described herein can provide a threshold of corruption, which is the fraction of servers that can be corrupted during a given stage, that is either arbitrarily close to ½ in the statistical security setting or arbitrarily close to ⅓ in the non-statistical security setting. The protocol disclosed in U.S. application Ser. No. 14/207,321 allowed the threshold to be arbitrarily close to ½.

A purpose of the protocol described herein is to securely store data distributed among a group of servers in such a way that if a malicious party captures a (limited) fraction of the data, then this data will "expire" after a given time. Any "expired" data gives the malicious party no information about the secret stored data. The present invention differs from previously known mobile proactive secret sharing protocols in that among those protocols secure against active adversaries, this protocol has the lowest communication complexity.

Mobile proactive secret sharing (MPSS) enables the storing of information in a secure, distributed fashion in a hostile environment where the storage platforms may change dynamically over time. A non-limiting example of an application of the invention includes storing data, such as sensitive security data like certificates, in a distributed fashion across nearby vehicles. If a fraction of vehicles are corrupted at any one time, security and integrity is still maintained. The group of vehicles participating in the storage can change over time.

Further, the invention described herein can be utilized to store data in a distributed fashion across unmanned aerial vehicles, soldiers, and other platforms. For instance, a group of soldiers can maintain a highly sensitive piece of information (such as encryption keys and identifying information) distributed across cell phones (or other communication devices) that each soldier possesses. Data security and integrity is maintained as long as less than 30% or 49% of soldiers are compromised.

The system according to embodiments of the present disclosure can also be used as a means of securing cell phone data. For instance, certain smart phone applications store sensitive information, such as cell phone data. The invention described herein can secure this data by dynamically spreading it to all cell phones in the area. This group of nearby cell phones changes dynamically, and as long as less than 30% or 49% of the cell phones are compromised, data security and integrity is maintained.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for mobile proactive secret sharing, the system comprising:
   one or more processors and a memory, the memory being a non-transitory computer-readable medium having executable instructions encoded thereon, such that upon execution of the instructions, the one or more processors perform operations of:
   initializing a First protocol to distribute a block of secret data among a set of servers comprising n servers of a synchronous network, wherein the block of secret data comprises a plurality of shares of data, wherein each server in the set of servers holds one share of data encoding the block of secret data, and wherein the plurality of shares of data is transmitted electronically via a secure, authenticated broadcast channel;
   initializing at least one Second protocol to protect against an adversary that attempts to corrupt the set of servers, wherein during a Second protocol the set of servers periodically refreshes its plurality of shares of data such that each server holds a new share of data that is independent of the previous share of data, wherein the set of servers engaged in a Second protocol and the number of servers, n, can change at each redistribution; and
   periodically erasing, by each server, the plurality of shares of data to preserve security against the adversary,
   wherein the at least one Second protocol comprises one of a statistically secure version and a perfect security version for security, against the adversary, the perfect security version having a threshold for corruption that is lower than that of the statistically secure version,
   wherein the at least one Second protocol is initiated as the perfect security version, then the threshold for corruption is raised in the statistically secure version using statistically secure virtualization.

2. The system as set forth in claim 1, wherein the one or more processors further perform an operation of initializing a Third protocol to reveal the block of secret data.

3. The system as set forth in claim 1, wherein n can increase or decrease by a factor of two at each Second protocol.

4. The system as set forth in claim 1, wherein a threshold of corruption is $\frac{1}{2}-\epsilon$ for perfect security, where $\epsilon$ is an arbitrary positive constant, and wherein provided that the adversary corrupts no more than a $\frac{1}{2}-\epsilon$ fraction of the set of servers, then the system maintains statistical security.

5. The system as set forth in claim 1, wherein a threshold of corruption is $\frac{1}{3}-\epsilon$ for perfect security, where $\epsilon$ is an arbitrary positive constant, and wherein provided that the adversary corrupts no more than a $\frac{1}{3}-\epsilon$ fraction of the set of servers, then the system maintains perfect security.

6. The system as set forth in claim 1, wherein if the adversary captures a fraction of data from the plurality of shares of data, then the fraction of data expires after a given time such that the expired fraction of data does not reveal any information about the blocks of secret data to the adversary.

7. A computer program product for mobile proactive secret sharing, the computer program product comprising:
   a non-transitory computer-readable medium having executable instructions encoded thereon, such that upon execution of the instructions by one or more processors, the one or more processors perform operations of:
   initializing a First protocol to distribute a block of secret data among a set of servers comprising n servers of a synchronous network, wherein the block of secret data comprises a plurality of shares of data, wherein each server in the set of servers holds one share of data encoding the block of secret data, and wherein the plurality of shares of data is transmitted electronically via a secure, authenticated broadcast channel;

initializing at least one Second protocol to protect against an adversary that attempts to corrupt the set of servers, wherein during a Second protocol the set of servers periodically refreshes its plurality of shares of data such that each server holds a new share of data that is independent of the previous share of data, wherein the set of servers engaged in a Second protocol and the number of servers, n, can change at each redistribution: and periodically erasing, by each server, the plurality of shares of data to preserve security against the adversary, wherein the at least one Second protocol comprises one of a statistically secure version and a perfect security version for security against the adversary, the perfect security version having a threshold for corruption that is lower than that of the statistically secure version, wherein the at least one Second protocol is initiated as the perfect security version, then the threshold for corruption is raised in the statistically secure version using statistically secure virtualization.

8. The computer program product as set forth in claim 7, further comprising instructions for causing the one or more processors to further perform an operation of initializing a Third protocol to reveal the block of secret data.

9. The computer program product as set forth in claim 7, wherein n can increase or decrease by a factor of two at each Second protocol.

10. The computer program product as set forth in claim 7, wherein a threshold of corruption is $\frac{1}{2}-\epsilon$ for statistical security, where $\epsilon$ is an arbitrary positive constant, and wherein provided that the adversary corrupts no more than a $\frac{1}{2}-\epsilon$ fraction of the set of servers, then the system maintains statistical security.

11. The computer program product as set forth in claim 7, wherein a threshold of corruption is $\frac{1}{3}-\epsilon$ for perfect security, where $\epsilon$ is an arbitrary positive constant, and wherein provided that the adversary corrupts no more than a $\frac{1}{3}-\epsilon$ fraction of the set of servers, then the system maintains perfect security.

12. The computer program product as set forth in claim 7, wherein if the adversary captures a fraction of data from the plurality of shares of data, then the fraction of data expires after a given time such that the expired fraction of data does not reveal any information about the blocks of secret data to the adversary.

13. A computer implemented method for mobile proactive secret sharing, the method comprising an act of:

causing one or more processers to execute instructions encoded on a non-transitory computer-readable medium, such that upon execution, the one or more processors perform operations of:

initializing a First protocol to distribute a block of secret data among a set of servers comprising n servers of a synchronous network, wherein the block of secret data comprises a plurality of shares of data, wherein each server in the set of servers holds one share of data encoding the block of secret data, and wherein the plurality of shares of data is transmitted electronically via a secure, authenticated broadcast channel;

initializing at least one Second protocol to protect against an adversary that attempts to corrupt the set of servers, wherein during a Second protocol the set of servers periodically refreshes its plurality of shares of data such that each server holds a new share of data that is independent of the previous share of data, wherein the set of servers engaged in a Second protocol and the number of servers, n, can change at each redistribution; and periodically erasing, by each server, the plurality of shares of data to preserve security against the adversary, wherein the at least one Second protocol comprises one of a statistically secure version and a perfect security version for security against the adversary, the perfect security version having a threshold for corruption that is lower than that of the statistically secure version, wherein the at least one Second protocol is initiated as the perfect Security version, then the threshold for corruption is raised in the statistically secure version using statistically secure virtualization.

14. The method as set forth in claim 13, wherein the one or more processors farther perform an operation of initializing a Third protocol to reveal the block of secret data.

15. The method as set forth in claim 13, wherein n can increase or decrease by a factor of two at each Second protocol.

16. The method as set forth in claim 13, wherein a threshold of corruption is $\frac{1}{2}-\epsilon$ for statistical security, where $\epsilon$ is an arbitrary positive constant, and wherein provided that the adversary corrupts no more than a $\frac{1}{2}-\epsilon$ fraction of the set of servers, then the system maintains statistical security.

17. The method as set forth in claim 13, wherein a threshold of corruption is $\frac{1}{3}-\epsilon$ for perfect security, where $\epsilon$ is an arbitrary positive constant, and wherein provided that the adversary corrupts no more than a $\frac{1}{3}-\epsilon$ fraction of the set of servers, then the system maintains perfect security.

18. The method as set forth in claim 13. wherein if the adversary captures a fraction of data from the plurality of shares of data, then the fraction of data expires after a given time such that the expired fraction of data does not reveal any information about the blocks of secret data to the adversary.

* * * * *